Feb. 3, 1925.                                                                1,524,892
H. D. TANNER
GEAR TESTING DEVICE
Filed March 24, 1921
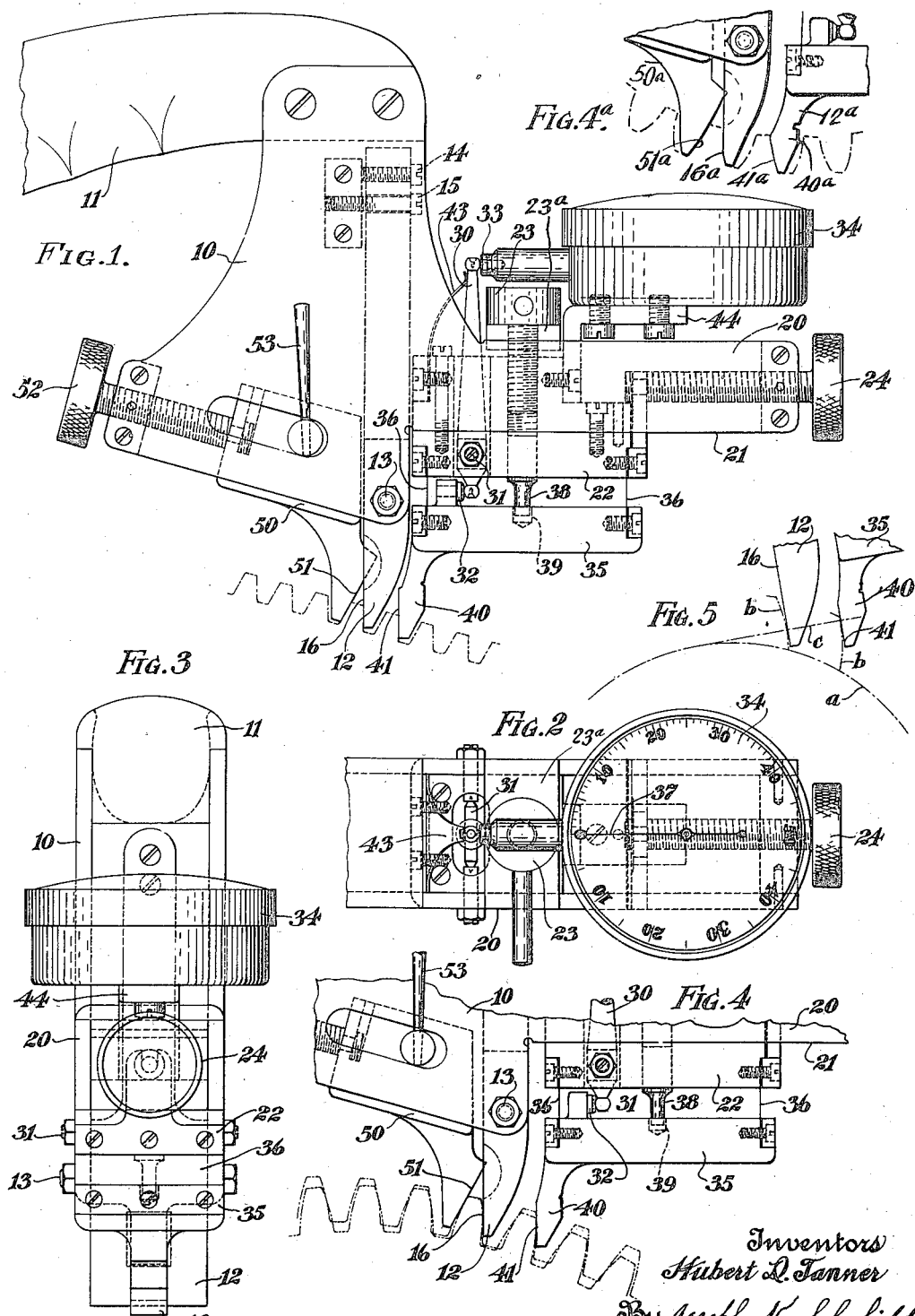

Patented Feb. 3, 1925.

1,524,892

UNITED STATES PATENT OFFICE.

HUBERT D. TANNER, OF HARTFORD, CONNECTICUT, ASSIGNOR TO PRATT & WHITNEY COMPANY, OF NEW YORK, N. Y., A CORPORATION OF NEW JERSEY.

GEAR-TESTING DEVICE.

Application filed March 24, 1921. Serial No. 454,989.

*To all whom it may concern:*

Be it known that I, HUBERT D. TANNER, a citizen of the United States, residing at Hartford, in the county of Hartford and State of Connecticut, have invented certain new and useful Improvements in Gear-Testing Devices, of which the following is a specification.

This invention relates to a method of and device for testing gears and relates particularly to a device for testing the accuracy of spacings between corresponding flanks of adjacent teeth and the correctness of outline of involute forms of gear teeth.

An object of the present invention is to provide a simple, compact and handy device which may be readily applied to the gear being tested. A further object of this invention is to indicate and accurately measure any errors in spacings between corresponding involute surfaces and errors of outlines of involute teeth.

One feature which enables me to accomplish the purposes for which this device has been designed is that it includes a fixed contact member and a movable contact member, each having a surface adapted to be adjusted into position so that each may be held in contact with one of corresponding involutes on adjacent gear teeth. These surfaces are in the preferred embodiment of the invention also maintained at all times parallel to each other. Then, with these parallel surfaces of the contact members in their adjusted position, the device may be rolled about a gear being tested as if it were another gear or a rack in mesh with the gear. Precision indicating means are also provided by means of which the distance between the parallel surfaces may be determined.

The device is primarily intended for determining inaccuracies of spacing and outline in involute gear teeth, and utilizes one of the properties of the involute form of teeth; that is, that the normal distance between adjacent involutes spaced equidistantly about the same base circle is always equal. Therefore, if two parallel plane surfaces, or corresponding involute surfaces, are applied in contact with corresponding adjacent involutes on an involute gear the distance between the surfaces must then indicate the normal distance between the involutes and variations of this distance between successive teeth will indicate errors in outline or spacing of the gear teeth. The distance measured by this device is therefore the distance between corresponding involutes, or, the "normal pitch" of the gear. Having determined this normal pitch of the gear and knowing the number of teeth in the gear, the circumference of the base circle may be obtained, and, from that the diameter of the base circle may readily be obtained. By mounting one of the contact surfaces in such a way that its distance from the other surface may be varied slightly, but its parallelism with the other surface maintained, very small errors in tooth outline, or spacing may be indicated. Movement of the movable contact member is preferably made to oscillate a pointer, and, as the movement of the pointer is greatly increased, it thus indicates errors in the contour of the gear teeth along their flanks or the spacing between the teeth to a high degree of precision.

Another feature which is advantageous is that one of the contact members is adjustable over a wide range so that the device may be utilized for gears having a very wide range of sizes and pitches.

With these and other objects in view, my invention consists in the features of construction and operation set forth in the following specification and illustrated in the accompanying drawings.

In the accompanying drawings annexed hereto and forming a part of this specification, I have shown my invention embodied in a device adapted to be manually applied to the periphery of a gear, but it will be understood that the invention can be otherwise embodied and that the drawings are not to be construed as defining or limiting the scope of the invention, the claims appended to this specification being relied upon for that purpose.

In the drawings:

Figure 1 is a front elevation of the complete device.

Fig. 2 is a plan view of the same, a part of the handle being broken away.

Fig. 3 is an end elevation of the complete device.

Fig. 4 is an enlarged view of the contact members shown in two slightly different positions of the gear being examined.

Fig. 4ª is a fragmentary view of a slightly modified form of the invention.

Fig. 5 is a diagram showing the position of the contact members relative to the involute surfaces of gear teeth.

In the above mentioned drawings, I have shown but one embodiment of the invention which is now deemed preferable, but it is to be understood that changes and modifications may be made within the scope of the appended claims without departing from the spirit of the invention.

Briefly, my invention in its broadest aspect comprises the following principal parts: first, a body member; second, a contact member preferably having a plane surface mounted on the body member; third, an adjustable carriage adapted to be moved along an extension to the body member and clamped into adjusted position; fourth, a movable contact member flexibly connected to the adjustable carriage and having a contacting surface parallel to that of the first mentioned contacting surface and the connection being such that these contact surfaces are maintained parallel; fifth, means to indicate variations in the position of the movable contact member relative to its carriage; and sixth, a member adapted to engage the opposite side of a gear tooth and adapted to hold the fixed contact member in position against a tooth flank.

Referring more in detail to the figures of the drawings, at 10 is shown a base or body member of the device to which is attached a handle member 11 by means of which it may be held in operative position against the gear under examination. Extending through the body member is a member 12 preferably pivotally mounted as shown at 13 and adjustably secured at its upper end by the two screws 14 and 15. A surface 16 at the outer and lower end of this member 12 is very carefully lapped so that it forms a true plane, the position of which may be slightly adjusted about the axis 13 by varying the adjustment of screws 14 and 15. The adjustment of member 12 is a preliminary one and when once set, the member 12 is maintained in that particular adjustment. The adjustment by means of screws 14 and 15 permits the contact surface 16 of the member 12 to be varied slightly to obtain absolutely true parallelism between the cooperating contact members.

Outstanding from the body member 10 is an extension 20 preferably formed as an integral part of the body member 10. On the lower surface 21 of extension 20 is adjustably clamped a block or carriage 22. As shown in Fig. 1, the block or carriage 22 may be clamped in any adjusted position against the lower surface 21 of extension 20 by means of clamping screw 23. A threaded aperture is provided in the central upper portion of the carriage 22 which is engaged by the clamping screw 23. Between the head of screw 23 and the upper surface of extension 20 is a strap 23ª. This strap 23ª bears against extension 20, and, by tightening the screw 23 forces the carriage 22 firmly against the surface 21 of extension 20. To adjust the position of the carriage 22, a screw 24 is provided, rotation of which moves the carriage 22 in either direction along the extension 20. Mounted on the carriage 22 is a lever 30 pivoted as shown at 31 and at its lower end bearing against a contact member 32. At its upper end, the lever 30 passes through the two side plates of the frame forming extension 20 and bears against the contact member 33 of a dial indicator 34, attached to and moving bodily with the block or carriage 22.

Flexibly attached to the carriage 22 and depending therefrom is a member 35 which is secured to the carriage 22 preferably by resilient strips 36. These strips 36 are formed of very thin bands of steel which permit the member 35 to readily move a short distance in a direction toward or from the surface 16 but hold the member 35 in proper position in all other directions. In order to limit the movement of the member 35 relative to the carriage 22, thus preventing injury to the strips 36, a pin 38 is inserted in carriage 22 the free end of which extends into a depression 39 formed in member 35. Depression 39 is slightly larger in diameter than the end of pin 38. The movement of member 35 relative to carriage 22 is therefore limited to the movement of the projection 38 within the depression 39.

Depending from the lower surface of the member 35 is an integral projection 40 on which is provided a surface 41 carefully lapped to a true plane in parallelism with the surface 16 on member 12. It will be noted that the slight movement of the member 35 relative to block 22 permitted by the flexible steel strips 36 will not affect the parallelism between the surfaces 16 and 41. The member 35 and its contact surface 41 are normally held toward the left as seen in Fig. 1 by means of a light spring 43 pressing against the upper end of lever 30 and thus causing this lever 30 at its lower end to press against contact 32 on the member 35. Also mounted on and movable with the carriage 22, preferably by means of a bracket 44 attached to a portion of the block 22, is the dial indicator 34. This at all times has its contact member 33 in engagement with the upper end of the lever 30.

The engagement of surfaces 16 and 41 of the testing device with the gear being tested is along elements of adjacent corresponding involute surfaces of the gear teeth, these elements being in the case of spur gears straight lines parallel to the axis of the gear.

To determine the distance between the plane surfaces 16 and 41, it is only necessary to place a micrometer in engagement with the surface 16 and surrounding the projection 40. With the thickness of projection 40 accurately known and with the projection held with the dial indicator in its position assumed during the use of the device, the distance between the surfaces 16 and 41 may be readily calculated.

On the opposite side of member 12 is an adjustable block 50. This has a surface 51 disposed at an acute angle to surface 16. The member 50 is also adjustable toward or away from the member 12 along the lower surface of the frame 10 by means of adjusting screw 52 and may be clamped in any adjusted position by clamping lever 53. Surface 51 is adapted to bear against a side of a gear tooth and thus serves to hold a tooth against the contact surface 16.

Referring to the diagram shown in Fig. 5, —a— refers to the base circle of an involute gear from which the involutes —b—b— are derived which thus form elements of the gear tooth flanks. At —c— is shown any tangent to the base circle —a— which must intersect the involutes —b—b— at right angles. With the plane parallel surfaces 16 and 41 in contact with the adjacent involutes —b—b— the distance between these plane surfaces is determined, which distance equals the normal distance between the involutes and also equals the arc of the base circle between the two involutes. This distance constitutes the normal pitch of the gear.

Coming now to a description of the method of using this device and referring particularly to Figs. 4 and 5, the position of the surface 51 is first adjusted relative to the surface 16 of member 12 so that a tooth of the gear being examined may be positioned therebetween with one of its involute gear tooth surfaces in contact with surface 16. The position of the carriage 22 is then adjusted by rotation of screw 24 so that the contact surface 41 is in contact with a corresponding involute surface of an adjacent tooth and the position of the member 35 is such that the pointer 37 of the dial indicator 34 and lever 30 are moved to approximately their mid position. The device is then oscillated relative to the gear, or, as shown in Fig. 4, the gear is oscillated relative to the testing device. Two positions of the gear are shown, the surfaces 16 and 41 being maintained in contact with the involute surfaces of the gear teeth. If the gear tooth outline is a true involute, the distance between the parallel planes 16 and 41 must remain constant so long as both surfaces are simultaneously on the involute surfaces of the adjacent teeth and therefore any deflection of the pointer 37 on the dial indicator 34 indicates errors in the spacing or outline of these surfaces. Should there be a deflection of the pointer 37 while the plane and parallel surfaces 16 and 41 are in contact with adjacent tooth curves the amount of deviation from a true involute form of tooth is at once determinable.

Repeating this operation with the surfaces 16 and 41 in contact with different tooth curves around the gear, variations in the tooth curve spacings will be indicated as well as errors in the involutes of the tooth curves.

The above device in effect simulates the inter-meshing action of the gear being tested and a rack. The rack form is chosen for contact surfaces on account of its ease of manufacture and possibility of accurate testing. It is obvious, however, that precision involutes might be substituted for surfaces 16 and 41 in which the action between the gear and testing device would simulate the rolling action of two gears. This is shown in Fig. 4ª in which 12ª corresponds with member 12 previously described except that surface 16ª, instead of being plane, is of involute form. Member 40ª also corresponds with member 40 except that its surface 41ª is involute instead of plane. Supporting member 50ª preferably has its bearing surface 51ª also curved into involute form. These involute surfaces 16ª, 41ª and 51ª conform exactly to tooth flanks of adjacent teeth of the same gear, the gear of which they occupy certain surfaces being shown in dotted outline.

What I claim is:

1. A method of testing involute gears comprising, applying gaging surfaces of a pair of contact members, connected so as to be maintained always parallel but otherwise capable of relative movement, to corresponding involute surfaces of adjacent teeth of a gear, and determining the distance between said surfaces when in contact with said involute surfaces.

2. A method of testing involute gears comprising, applying plane gaging surfaces of a pair of contact members, connected so as to be maintained always parallel but otherwise capable of relative movement, to corresponding involute surfaces of adjacent teeth of a gear, and determining the distance between said surfaces when in contact with said involute surfaces.

3. A method of testing involute gears comprising, applying parallel gaging surfaces of a pair of contact members, connected so as to be maintained always parallel but otherwise capable of relative movement, to corresponding involute surfaces of adjacent teeth of a gear, maintaining said surfaces of the contacting members at all times parallel, and determining the distance between said surfaces when in contact with said involute surfaces.

4. A method of testing involute gears comprising, applying gaging surfaces of a pair of contact members, connected so as to be maintained always parallel but otherwise capable of relative movement, to corresponding involute surfaces of adjacent teeth of a gear, rolling said contacting members on said gear teeth, and determining the distance between said surfaces when in contact with said involute surfaces of the gear teeth when in different positions on said gear.

5. A method of testing involute gears comprising, applying parallel gaging surfaces of a pair of contact members, connected so as to be maintained always parallel but otherwise capable of relative movement, to corresponding involute surfaces of adjacent teeth of a gear, said surfaces on the contact members being maintained parallel to each other, and determining the distance between said surfaces of the contact members when simultaneously in contact with adjacent involute surfaces of said gear in different positions of said contacting members relative to said gear.

6. A method of testing involute gears comprising, applying parallel gaging surfaces of a pair of contact members, connected so as to be maintained always parallel but otherwise capable of relative movement, to corresponding involute surfaces of adjacent teeth of a gear, said surfaces on the contacting members being maintained parallel to each other in all positions of adjustment, and determining variations in the distance between said surfaces when in contact with said involute surfaces as said contacting members are rolled to contact with different portions of the involute surfaces of said gear.

7. A method of testing involute gears comprising, applying plane parallel gaging surfaces of a pair of contact members to corresponding involute surfaces of adjacent teeth of a gear, said surfaces on the contacting members being maintained parallel to each other in all positions of adjustment, and determining variations in the distance between said surfaces when in contact with said involute surfaces as said contacting members are rolled to contact with different portions of the involute surfaces of said gear.

8. A method of testing involute gears comprising, applying parallel surfaces of a pair of relatively movable contact members to corresponding involute surfaces of adjacent teeth of a gear, determining the distance between said surfaces when in contact with said involute surfaces, and repeating said operation with the parallel surfaces of the contact members in engagement with corresponding involute surfaces or different teeth on the gear being tested.

9. A method of testing involute gears comprising, applying parallel surfaces of a pair of contact members to corresponding involute surfaces of adjacent teeth of a gear rolling said contacting members on said gear teeth, determining the distance between said surfaces when in contact with said involute surfaces of the gear when in different positions on said gear, and repeating said operation with the parallel surfaces of the contact members in engagement with corresponding involute surfaces of different teeth on the gear being tested.

10. A method of testing involute gears comprising, applying parallel surfaces of a pair of contact members to corresponding involute surfaces of adjacent teeth of a gear, rolling said contacting members on said gear teeth, determining variations in the normal distance between said surfaces when in contact with different portions of the involute tooth curves, and repeating said operation with the parallel surfaces of the contact members in engagement with corresponding involute surfaces of different teeth on the gear being tested.

11. A device for testing gears comprising in combination, a body member, a contact member thereon having a surface adapted to engage one side of a gear tooth, in line contact, means for holding said contact member in contact with said gear tooth, a contact member movable relative to said first contact member adapted to engage the corresponding side of an adjacent gear tooth, and means to indicate variations in the distance between said contact members.

12. A device for testing gears comprising in combination, a body member, a contact member thereon having a surface adapted to engage an element of one side of a gear tooth in line contact, means for holding said contact member in contact with said gear tooth, a contact member movable relative to said first contact member having a similar surface adapted to engage the corresponding side of an adjacent gear tooth, and means to indicate variations in the distance between said contact members as said contact members are rolled about said gear teeth.

13. A device for testing gears comprising in combination, a body member, a contact member thereon having a plane surface adapted to engage one side of a gear tooth, means for holding said contact member in contact with said gear tooth, a contact member movable relative to said first contact member having a surface parallel with said first contact member, means to adjust the position of said movable contact member, and means to indicate variations in the distance between said contact members.

14. A device for testing gears comprising in combination, a body member, a contact member thereon having a plane surface adapted to engage one side of a gear tooth, means holding said contact member in contact with said gear tooth, a contact member movable relative to said first contact member having a surface maintained at all times parallel with said first contact member, means to adjust the position of said movable contact member, and means to indicate variations in the distance between said contact members.

15. A device for testing gears comprising in combination, a body member, a contact member thereon having a surface adapted to engage one side of a gear tooth, means for holding said contact member in contact with said gear tooth, a contact member movable relative to said first contact member having a similar surface adapted to engage the corresponding side of an adjacent gear tooth, and lever operated means to indicate variations in the normal distance between said surfaces of said contact members as said contact members are rolled about said gear teeth.

16. A device for testing gears comprising in combination, a body member, a contact member thereon having a surface adapted to engage one side of a gear tooth, means to vary the angular position of said contact member relative to said body member, means holding said contact member in contact with said gear tooth, a contact member movable relative to said first contact member having a gear tooth contacting surface parallel with said first contact member, means to adjust the position of said movable contact member, and means to indicate variations in the distance between said contact members.

17. A device for testing the accuracy of involute surfaces of gear teeth comprising in combination, a body member, a contact member thereon having a surface adapted to engage the involute surface of a gear tooth upon one of its elements, means to vary the angular position of said contact member relative to said body member, means holding said contact member against the involute surface of said gear tooth, a contact member movable relative to said first contact member having a similar surface parallel with said first contact member, means permitting movement of said movable contact member to maintain parallelism with said first contact member, and means to indicate variations in the distance between said contact members.

In testimony whereof, I hereto affix my signature.

HUBERT D. TANNER.